United States Patent
Verdi et al.

(10) Patent No.: US 8,667,698 B2
(45) Date of Patent: Mar. 11, 2014

(54) CO-ORDINATE MEASURING MACHINE

(75) Inventors: Michele Verdi, Rivoli (IT); Alberto Tarizzo, Turin (IT)

(73) Assignee: Hexagon Metrology S.p.A., Moncalieri (IT)

(*) Notice: Subject to any disclaimer, the term of this patent is extended or adjusted under 35 U.S.C. 154(b) by 237 days.

(21) Appl. No.: 13/340,156

(22) Filed: Dec. 29, 2011

(65) Prior Publication Data
US 2012/0167402 A1 Jul. 5, 2012

(30) Foreign Application Priority Data
Dec. 30, 2010 (EP) .................................. 10425404

(51) Int. Cl.
*G01B 5/008* (2006.01)

(52) U.S. Cl.
USPC ............................................. 33/503; 33/702

(58) Field of Classification Search
USPC .................................................. 33/503, 702
See application file for complete search history.

(56) References Cited

U.S. PATENT DOCUMENTS

| | | | | |
|---|---|---|---|---|
| 4,928,019 A | | 5/1990 | Tomikawa et al. | |
| 5,001,842 A | * | 3/1991 | Wright et al. | 33/702 |
| 5,130,523 A | * | 7/1992 | Raleigh et al. | 250/202 |
| 5,191,717 A | * | 3/1993 | Fujitani et al. | 33/503 |
| 5,892,680 A | | 4/1999 | Kita et al. | |
| 6,941,669 B2 | * | 9/2005 | Shivaswamy et al. | 33/502 |
| 7,222,434 B2 | * | 5/2007 | Kikuchi | 33/503 |
| 8,452,564 B2 | * | 5/2013 | Balsamo et al. | 702/95 |
| 2002/0189117 A1 | * | 12/2002 | Gotz et al. | 33/503 |
| 2005/0097766 A1 | * | 5/2005 | Weekers et al. | 33/702 |
| 2009/0013549 A1 | * | 1/2009 | Lutz | 33/503 |
| 2011/0102808 A1 | * | 5/2011 | Verdi et al. | 356/614 |
| 2011/0296701 A1 | * | 12/2011 | Tarizzo | 33/503 |
| 2012/0084989 A1 | * | 4/2012 | Pettersson et al. | 33/503 |
| 2013/0232805 A1 | * | 9/2013 | Russo | 33/701 |

FOREIGN PATENT DOCUMENTS

| | | |
|---|---|---|
| DE | 42 43 393 A1 | 6/1994 |
| EP | 0 603 534 A | 6/1994 |
| JP | 59-180323 A | 10/1984 |
| JP | 60-029604 A | 2/1985 |

OTHER PUBLICATIONS

European Search Report dated May 20, 2011 as received in application No. 10 42 5404.

* cited by examiner

*Primary Examiner* — Christopher Fulton
(74) *Attorney, Agent, or Firm* — Maschoff Brennan (57) ABSTRACT

A co-ordinate measuring machine comprising a bed provided with a horizontal measuring surface, a unit that is mobile along guides carried by the bed itself, an annular structure extending along a perimetral area of the bed and constrained thereto by statically determinate means of constraint, and a plurality of displacement sensors set between the annular structure and one between the bed and the mobile unit for detecting relative displacements with respect to an initial reference condition.

15 Claims, 6 Drawing Sheets

CO-ORDINATE MEASURING MACHINE

TECHNICAL FIELD

The present invention relates to a co-ordinate measuring machine.

STATE OF THE ART

As is known, co-ordinate measuring machines generally comprise a bed designed to support the workpiece to be measured and a mobile unit for moving a measuring sensor with respect to the bed.

More in particular, the mobile unit generally comprises a first carriage, which is mobile on the bed along guides parallel to a first axis, a second carriage, which is carried by the first carriage and is mobile along a second axis orthogonal to the first axis, and a third carriage, which is carried by the second carriage and is mobile with respect thereto along a third axis orthogonal to the first two axes. The measuring sensor is carried by the third carriage.

In machines of the type described briefly above, the bed has the dual purpose of supporting the workpiece and of defining the guides for the first carriage.

This entails various drawbacks.

In the first place, positioning of the workpiece on the bed, in particular in the case where the weight of the workpiece is considerable, entails deformation of the bed itself, which causes a deformation of the guides and hence induces measurement errors.

In addition, the movement of the carriages of the mobile unit, and in particular of the main carriage, along the guides induces deformations on the bed and hence alters the position of the workpiece. There thus arise further measurement errors.

In order to maintain the deformations of the bed within contained limits, the bed itself is normally made of a hard mineral material, typically granite.

To solve at least partially the problems linked to the weight of the workpiece, solutions have been proposed in which the granite bed is uncoupled from the supporting structure.

WO 89/03505 discloses a measuring machine comprising a metal base, which carries the guides for the mobile unit, and resting on which is a granite worktable.

GB-A-2080954 discloses a measuring machine in which a workpiece-holder table made of hard mineral material is constrained to an underlying metal base, provided with guides for the mobile unit, via elements for positioning without any play and such as not to transmit stresses.

Drawbacks linked to the use of granite beds are represented by the cost, weight, and difficulty of availability of granite in a short time.

In addition, both of the solutions described above require complex and costly base structures.

WO 2009/139014 discloses a co-ordinate measuring machine in which, in order to solve the problems referred to above, the bed comprises a perimetral metal frame provided with guides for the mobile unit and a workpiece-holder table housed within the frame, wherein the workpiece-holder table and the frame are constrained to one another by means of constraints of a statically determinate type that uncouple the deformations thereof.

In this way, the workpiece-holder table can be made of non-metrological material, for example concrete.

Whilst presenting the aforesaid advantages, the structure of the machine is nevertheless relatively complex.

SUBJECT OF THE INVENTION

The aim of the present invention is to provide a simplified measuring machine that will enable the drawbacks referred to above to be overcome.

The aforesaid aim is achieved by a co-ordinate measuring machine according to claim 1.

BRIEF DESCRIPTION OF THE DRAWINGS

For a better understanding of the present invention some preferred embodiments are described in what follows, by way of non-limiting example and with reference to the attached drawings, wherein.

Figure 1:
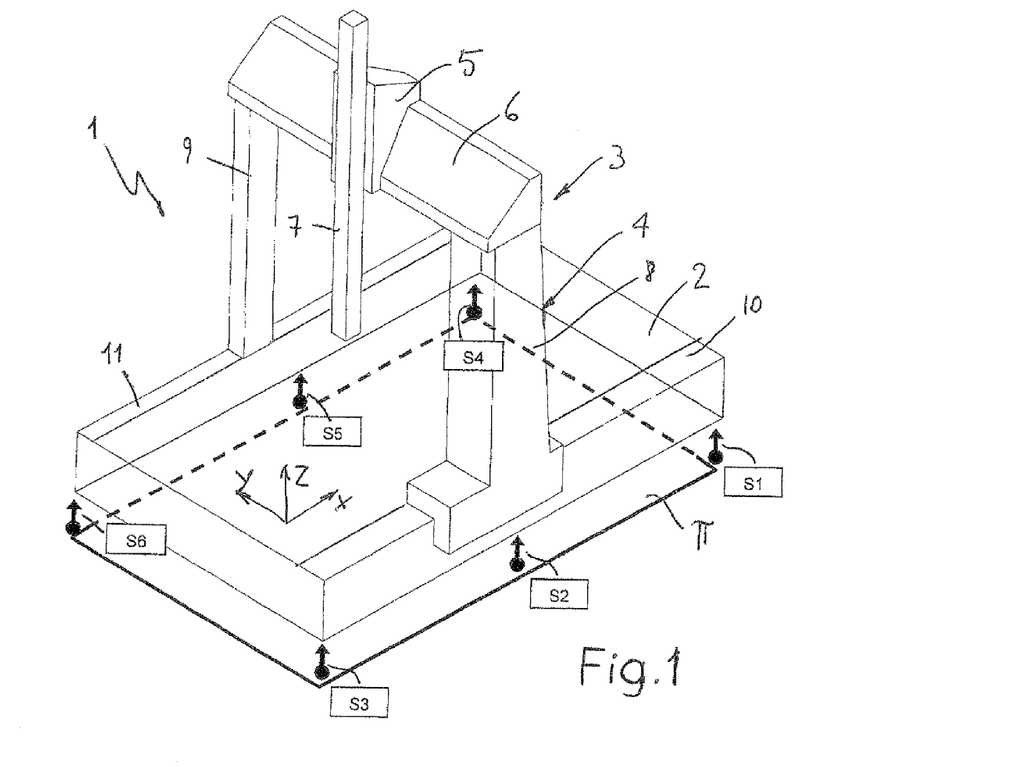
FIG. 1 is a perspective and schematic view of a measuring machine provided according to the present invention.

With reference to FIG. 1, designated as a whole by 1 is a measuring machine comprising a bed 2 and a mobile unit 3. The mobile unit 3 comprises:

a first carriage 4, which is bridge-shaped and is mobile along the bed 2 parallel to a first axis X longitudinal with respect to the bed itself, which forms part of a set of three co-ordinate axes X, Y, Z;

a second carriage 5, mobile along a cross member 6 of the first carriage 4 parallel to the axis Y; and a measuring head 7 carried by the second carriage 5, which is vertically mobile with respect thereto along the axis Z and is designed to carry a measuring tool (not illustrated).

More precisely, the first carriage 4 comprises a pair of uprights 8, 9, which support the cross member 6 and are mobile along a main guide 10 and a sliding path 11, respectively, which are parallel to the axis X and are provided on the opposite longitudinal edges of the bed 2.

According to the present invention, the deformations of the bed are detected and compensated, in use, via a plurality of sensors S1-S6, which measure the vertical displacement of corresponding points of the bed 2 with respect to a substantially horizontal reference plane π. The expression "substantially horizontal" is understood in the sense that in its practical embodiment the plane π may undergo minor rigid displacements with respect to a perfectly horizontal position, as will be described in what follows.

The readings of the sensors S1-S6 are set at zero at the moment when geometrical compensation of the machine is carried out. Consequently, in use, all the values of displacement consequent upon the deformations of the bed 2 and detected by the sensors S1-S6 are understood as variations with respect to the initial zero. Thus, processing of the readings of the sensors enables, each time, determination of a variation of the geometry of the bed with respect to the initial state, described by the geometrical-compensation map.

In the schematic example of FIG. 1, the six sensors S1-S6 are positioned underneath the bed 2, in the proximity of the four corners and at the middle of the longitudinal sides. Thanks to the use of the sensors, it is possible to correct main deformations of the bed due to different causes, such as instability of the material, application of the weight of the workpiece to be measured, variations of environmental temperature, etc.

Consequently, it is possible to use for the bed alternative materials, i.e., ones not provided with the requirements of stiffness and stability required by conventional metrological applications, such as for example concrete.

Figure 2:
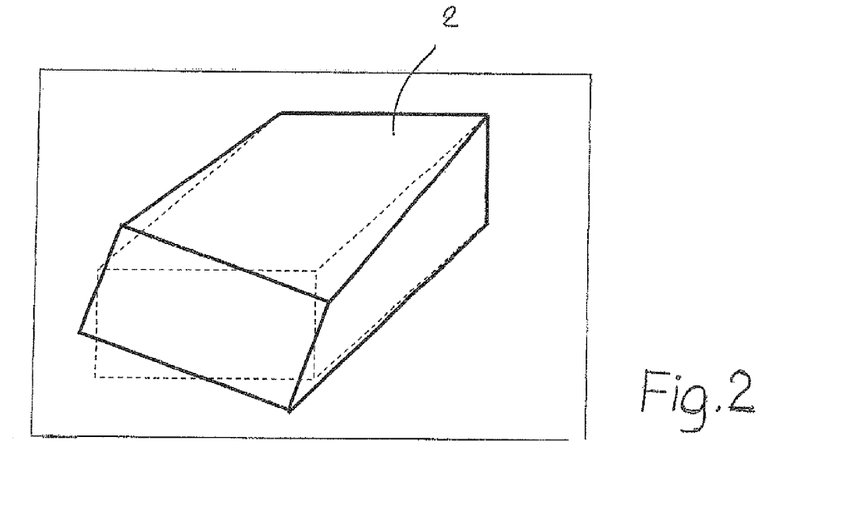
FIGS. 2 and 3 are schematic representations of modes of deformation of a bed of the machine of FIG. 1.

FIG. 2 is a schematic illustration of the torsional deformation of the bed, which causes rolling of the first carriage 4 along its travel.

The torsional deformation determines differences of reading $l_{S_n}$ between the sensors (S1, S2, S3) set on one side of the bed 2 and the corresponding sensors (S4, S5, S6) set on the opposite side.

Said differences, divided by the transverse distance t between the pairs of homologous sensors, represent an angle of rotation about the axis X for each cross section of the bed 2 where the sensors are applied.

By evaluating the differences between the angles of rotation in the various sections a possible rigid rotation is excluded, and torsion of the bed is obtained. In particular, the torsion of the first stretch of bed comprised between the pairs of sensors S1-S4 and S2-S5 is given by the expression $$((l_{S2}-l_{S5})-(l_{S1}-l_{S4}))/t$$

Likewise, the torsion of the first stretch of bed comprised between the pairs of sensors S2-S5 and S3-S6 is given by the expression $$((l_{S3}-l_{S6})-(l_{S2}-l_{S5}))/t$$

Roll of the first carriage 4 can hence be corrected introducing into the machine-compensation map an appropriate variation based upon the calculated torsion angles.

Figure 3:
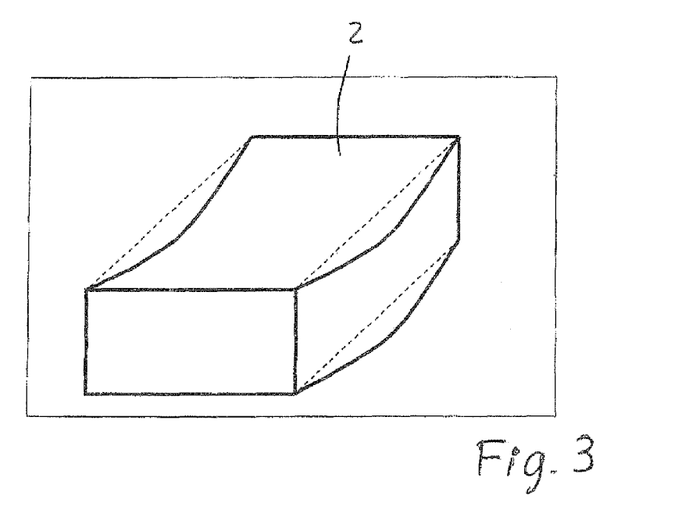
Figure 4:
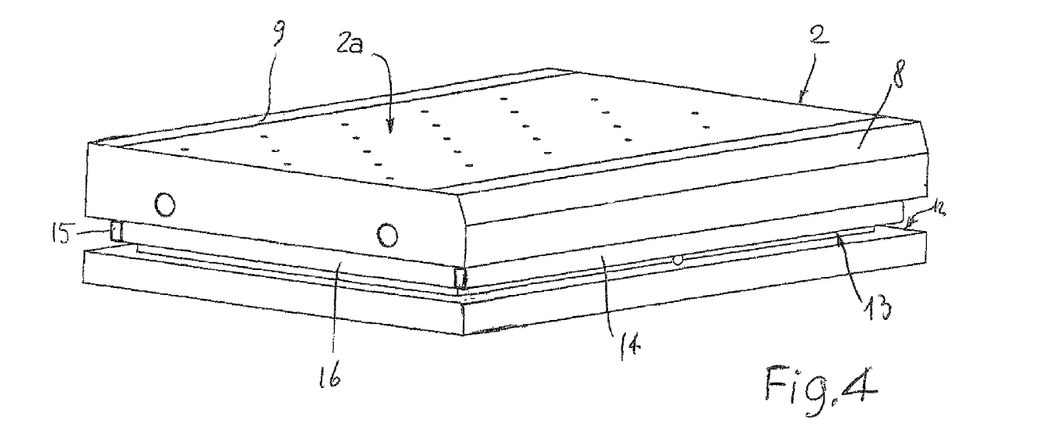
FIG. 4 is a perspective view of a bed of a measuring machine according to a first embodiment of the invention.

FIG. 3 is a schematic illustration of the flexural deformation of the bed 2, which causes pitching of the first carriage 4 along its travel.

The flexural deformation gives rise to differences of reading between the sensors set on one and the same side of the bed; in particular, the sensors S1, S2, S3 set on the side where the main guide 10 of the first carriage 4 is located are considered.

The difference between the reading $l_{S2}$ of the central sensor S2 and the average of the readings $l_{S1}$, $l_{S3}$ of the end sensors S1, S3 corresponds to the vertical deflection of the elastica followed by said side of the bed. Said elastica indicates the deformation with respect to an undeformed configuration referred to the end sensors S1, S3. Consequently, it does not depend upon a possible rigid rotation but takes into account exclusively the actual flexure of the bed 2.

Assuming a linear trend of the flexure angle, it is possible to calculate the corresponding curvature $$1/R=(8*(S2-(S1+S3)/2))/(\text{distance } S1-S3)^2$$

Pitch of the first carriage 4 can hence be corrected by entering into the machine-compensation map an appropriate variation based upon the calculated curvature.

FIGS. 4 to 7 illustrate a first practical embodiment of the present invention.

The bed 2, delimited at the top by a plane surface 20, is provided with a peripheral groove 12 defining a seat for an annular structure 13 designed to define the reference plane π.

More in particular, the annular structure 13 is constituted by four metal sectional elements 14, 15, 16, 17 with quadrangular cross section, welded to one another to form a sort of rectangular frame. The sectional elements 14, 15 are set in a direction parallel to the axis X, whilst the sectional elements 16, 17 are set in a direction parallel to the axis Y.

All the sectional elements preferably have a hollow rectangular cross section, and the sectional elements 16, 17 are welded, for example butt welded, to the ends of the sectional elements 14, 15.

Figure 5:
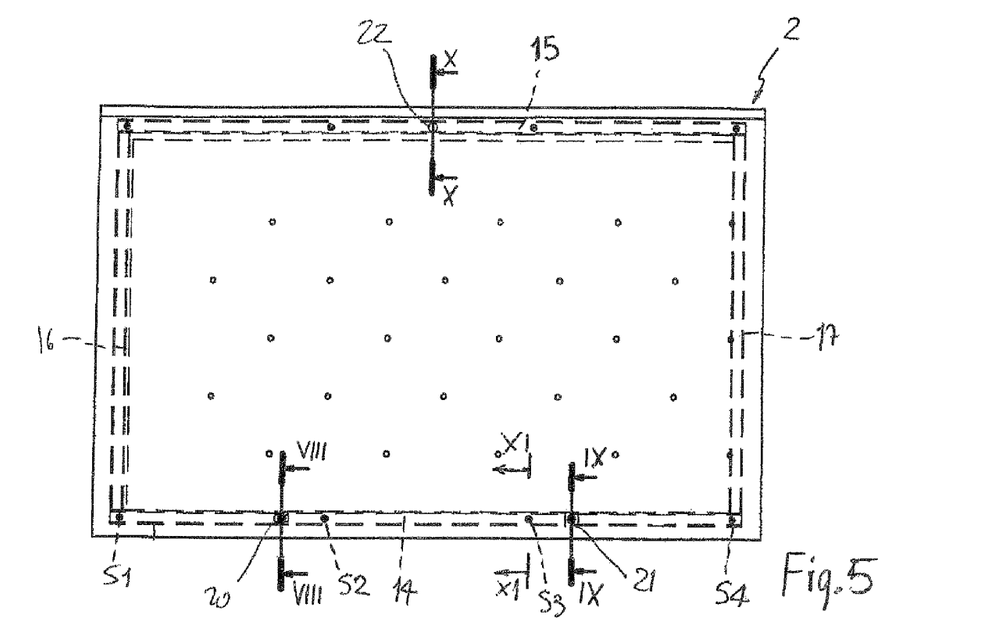
FIGS. 5, 6 and 7 are, respectively, a top plan view, a side view, and a front view of the bed of FIG. 4.
Figure 6:
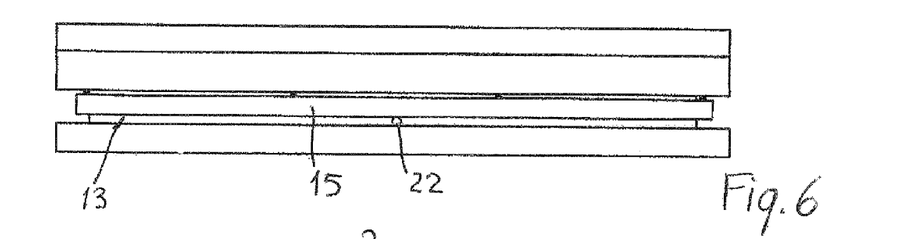
Figure 7:
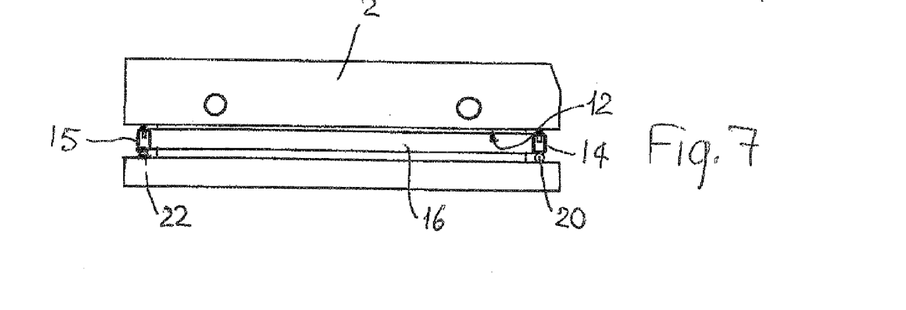

The annular structure 13 is constrained to the bed 2 via a system of statically determinate constraints defined by two constraints 20, 21 arranged along the sectional element 14, and by one constraint 22 in the middle of the sectional element 15 (FIG. 5).

Figure 8:
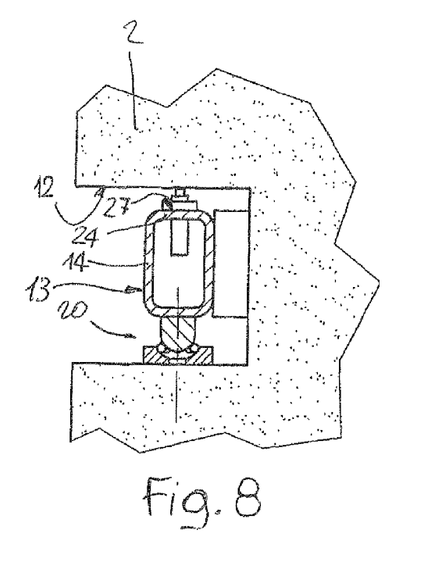
FIGS. 8, 9, 10 and 11 are sections according to the lines VIII-VIII, IX-IX, X-X and XII-XII.
Figure 9:
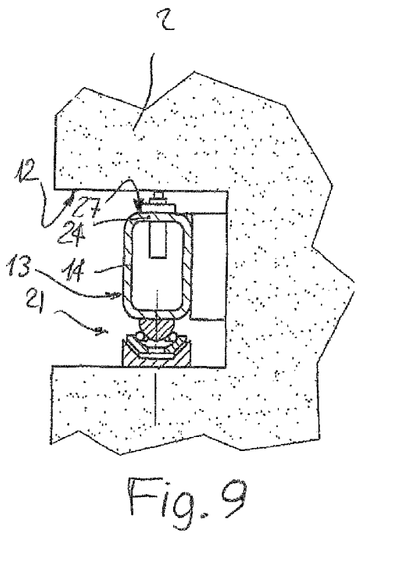
Figure 10:
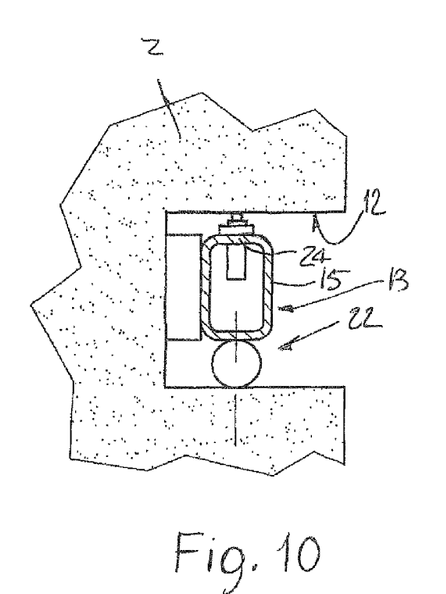

FIGS. 8, 9, and 10 are schematic representations of the constraints 20, 21, 22, which eliminate, respectively, three degrees of freedom, two degrees of freedom, and one degree of freedom.

In this way, the annular structure 13 is constrained to the bed 2 in such a way as to uncouple the deformations thereof. Consequently, even in the presence of deformations of the bed 2, the annular structure 13 may at the most be subject to a roto-translation with respect to the bed 2 but does not undergo deformation.

In this case, eight sensors S1-S8 are used, four of which (S1, S2, S3, S4) are set between the sectional element 14 and the bed 2, and four (S5, S6, S7, S8) are set between the sectional element 15 and the bed 2. More precisely, each sensor S1, . . . , S8 is provided with a body 23, rigidly fixed to a top wall 24 of the corresponding sectional element 14, 15 (FIG. 11) and a mobile member 25 that bears on a surface 26 of the bed 2 that delimits the groove 12 at the top.

Figure 11:
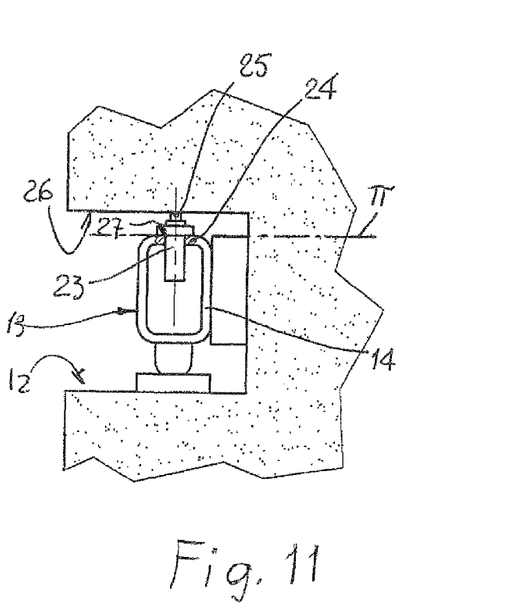

The plane π is consequently defined by a top surface 27 of the annular structure 13, which, thanks to the system of statically determinate constraints, is kept planar but is subject to roto-translations, albeit minor ones, which can lead to small deviations of the plane π with respect to the horizontal.

The constraint 20 represented schematically in FIG. 8 may conveniently be constituted by a ball-ball support or else a ball-cone support; the constraint 21 represented schematically in FIG. 9 may conveniently be constituted by a ball-notched surface support; the constraint 22 represented schematically in FIG. 10 may conveniently be constituted by a ball-plane support.

Conveniently, in order to render the aforesaid supports bidirectional in a vertical direction, springs (not illustrated) may be set between the top surface 27 of the annular structure 13 and the surface 26 of the bed 2. Said springs can be conveniently incorporated in the sensors S1, S8 so as to load the mobile members 25 elastically against the surface 26.

Figure 12:
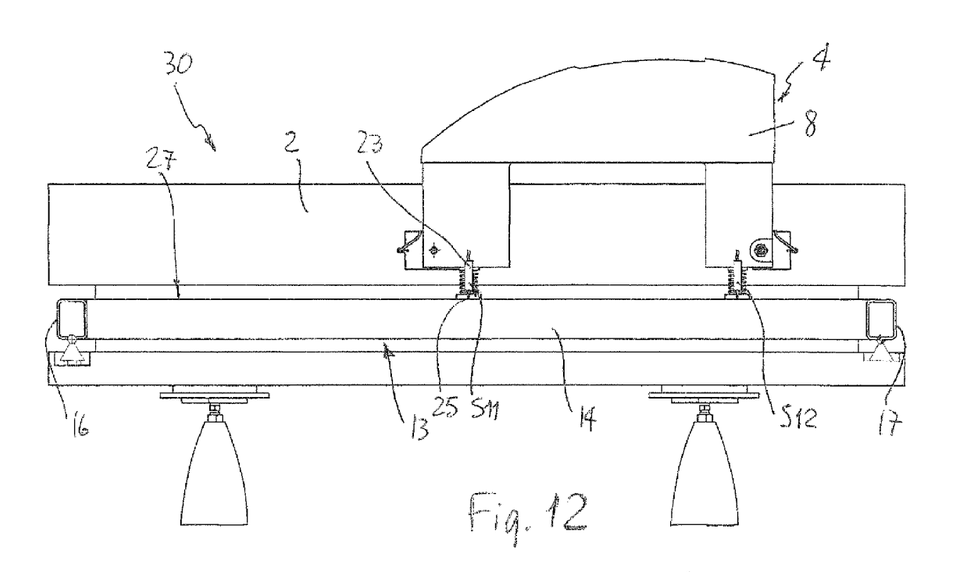
FIG. 12 is a partial side view of a second embodiment of a measuring machine according to the present invention.
Figure 13:
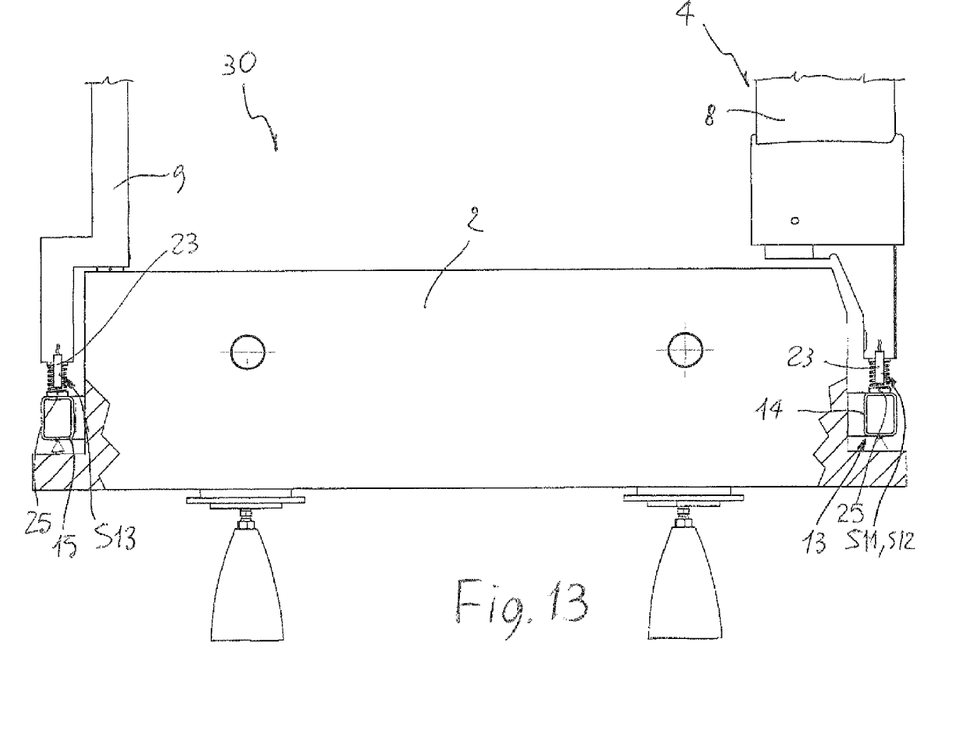
FIG. 13 is a partially sectioned front view, at an enlarged scale, of the machine of FIG. 12.

FIGS. 12 and 13 illustrate another embodiment of the invention, designated as a whole by 30, in which three sensors S11, S12, S13 are used set between the annular structure 13 and the first carriage 4, instead of the bed 2.

In particular, the sensors S11-S13 have the body 23 fixed to the first carriage 4 and the mobile member 25 in sliding contact with the top surface 27 of the annular structure 13. The sensors S11, SS12 are carried by the upright 8 of the first carriage 4 and have the mobile member 25 in contact with the sectional element 14. The sensor S13 is carried by the upright 9 of the first carriage and has the mobile member 25 in contact with the sectional element 15. The sensors S11, S12 are aligned to one another and set at a distance apart in the direction of the axis X.

In this way, it is possible to detect pitch and roll of the first carriage 4 in real time following upon the deformations of the bed 2 via the deviations of the sensors S11-S13 with respect to the zero position defined at the time of the geometrical compensation of the machine and, consequently, compensate for the measurement errors induced thereby. In the case where it is necessary to take into account deformations of the bed induced by the weight or by the temperature variations, it is possible to update the geometrical-compensation map of the machine in real time. If, instead, it is necessary to compensate only the instability of the material constituting the bed 2, a sampling in time at low frequency is sufficient.

Figure 14:
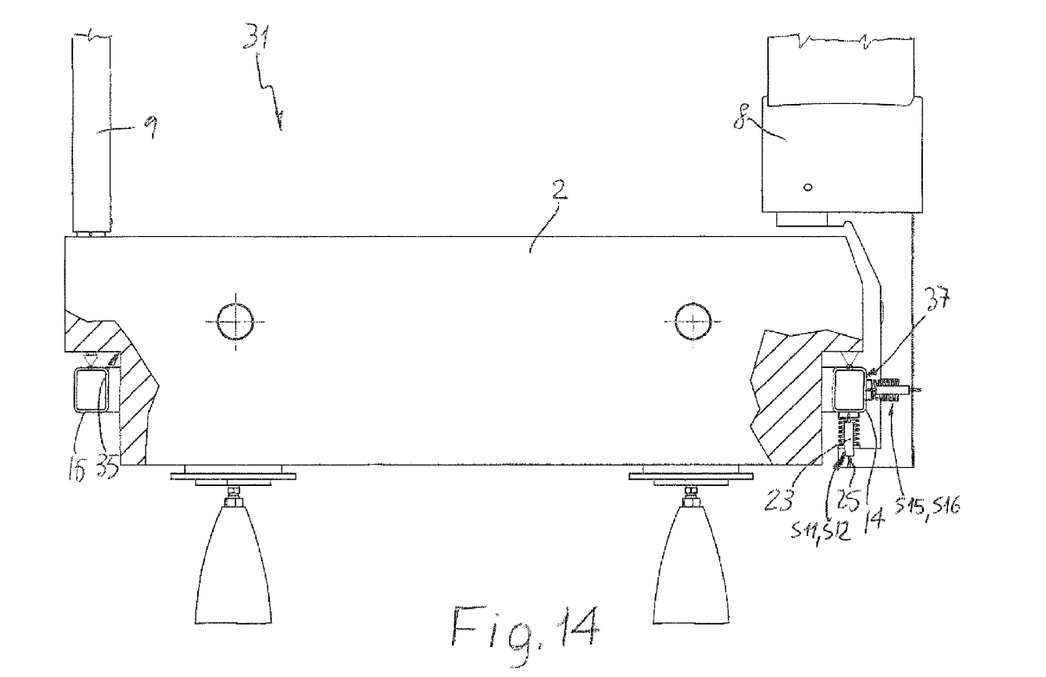
FIGS. 14 and 15 are views similar to that of FIG. 13 of measuring machines according to two further embodiments of the invention.

FIG. 14 illustrates a different embodiment of the present invention, designated as a whole by the reference number 31.

In this case, the annular structure 13 is "suspended" from the bed 2 and set in a bottom perimetral recess 35 thereof. Two sensors S11 and S12 are carried by the upright 8 of the first carriage 4 and once again set with their axis vertical, but detect a bottom surface 36, instead of the top surface, of the sectional element 14. As compared to the solution of FIGS. 12, 13, the most substantial difference is represented by the fact that, instead of the sensor S13 mounted on the upright 9, sensors S15, S16 are used mounted on the upright 8 of the first carriage 4, in a position adjacent to the sensors S11, S12 but with their axis horizontal in such a way that the mobile member 25 will contact a side surface 37 of the sectional element 14.

The sensors S15, S16 detect the roll and yaw rotations, which can be decomposed and corrected analytically.

Figure 15:
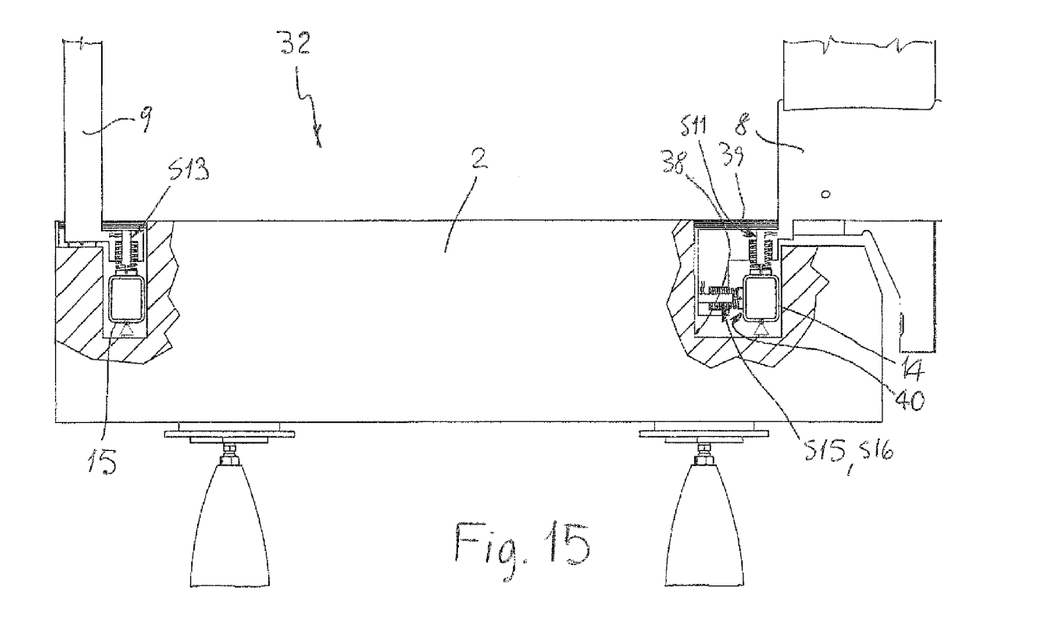

FIG. 15 illustrates a further embodiment of the present invention, designated as a whole by 32.

In this solution, the annular structure 13 is housed in a perimetral trench 38 provided on the top surface of the bed 2. Said trench can be effectively covered by a bellows protection 39 of a conventional type. The machine comprises three sensors S11, S12, S13 arranged on, and interacting with, the annular structure 13 in a way similar to what has been described with reference to the solution of FIGS. 12 and 13. The machine moreover comprises two sensors S15, S16 carried by the upright in a position adjacent to the sensors S11, S12 but with their axis horizontal in such a way that the mobile member 25 contacts an internal side surface 40 of the sectional element 14.

The sensors S11-S13 have the function of detecting the pitch and roll rotations, the sensors S15, S16 have the function of detecting prevalently the yaw rotations (with a small component of roll, which can be decomposed analytically).

From an examination of the characteristics of the machines 1, 30, 31 and 32 the advantages that the present invention affords are evident.

By means of the combined use of an annular structure 13 constrained to the bed 2 in a statically determinate way and a plurality of sensors Sn set between said structure 13 and one between the bed 2 and the mobile unit 2 of the machine, it is possible to determine and compensate the measurement errors introduced by the deformations of the bed 2 due to various causes, such as the weight of the workpiece, the weight of the mobile unit, the instability of the material, etc.

Consequently, it is possible to make the bed of a "non-metrological" material, i.e., a material not provided with characteristics of stiffness and stability typical of metrological applications, such as, for example, concrete, and at the same time maintain a conventional structure of the machine, with the guides for the mobile unit 3 provided directly on the bed.

Consequently, it is possible to achieve optimal metrological performance albeit substantially reducing the costs of the machine.

Finally, it is clear that modifications and variations may be made to the machine, without thereby departing from the sphere of protection of the present invention.

For example, the bed can be made of any material, and in particular of any non-metallic pourable material, for example a resin with appropriate fillers.

In the case where the material used is concrete or another material not provided with sufficient requirements of stiffness, hardness, or stability, the measuring surface can be coated with another material, such as granite, having the aforesaid characteristics. Likewise, the guides or paths can be coated with a metal or non-metal material having the necessary mechanical characteristics, in particular of resistance to wear.

Also the annular structure 13 can be made of a different material, for example a composite material or granite, which are substantially invariant with temperature. In the case where the annular structure 13 is made of a metal material, as in the embodiments described, in order to reduce the effects of the thermal expansion it is possible to close the seat 12 and insulate it thermally.

The invention claimed is:

1. A co-ordinate measuring machine comprising:
   a bed provided with a horizontal measuring surface;
   a unit that is mobile along guides carried by said bed, said machine being;
   a closed annular structure extending along a perimetral area of the bed and constrained thereto by statically determinate constraint means; and
   a plurality of displacement sensors set between said annular structure and one of the bed and the mobile unit for detecting relative displacements with respect to an initial reference condition.

2. The machine according to claim 1, wherein said bed is made at least prevalently of a non-metallic pourable material.

3. The machine according to claim 2, wherein said non-metallic pourable material is concrete.

4. The machine according to claim 1, wherein said annular structure is rectangular.

5. The machine according to claim 1, wherein said annular structure is made of a metal material.

6. The machine according to claim 5, wherein said annular structure is constituted by four metal sectional elements that constitute the sides thereof and are rigidly fixed to one another.

7. The machine according to claim 5, wherein said annular structure faces a plane annular surface of said bed parallel to said measuring surface.

8. The machine according to claim 1, wherein the annular structure is housed in a perimetral seat of the bed.

9. The machine according to claim 8, wherein the perimetral seat is closed by a guard.

10. The machine according to claim 9, wherein said sensors are carried by said annular structure and are provided with a detector member with vertical axis set in contact with said annular surface.

11. The machine according to claim 8, wherein the seat is thermally insulated.

12. The machine according to claim 1, wherein said sensors are carried by said mobile unit and are provided with respective detector members set in contact with said annular structure.

13. The machine according to claim 12, wherein said detector members are arranged with their axis vertical and are designed to detect a substantially horizontal surface of said annular structure.

14. The machine according to claim 12, wherein said detector members are arranged with their axis horizontal and in contact with a substantially vertical surface of said annular structure.

15. A method of compensating for measurement errors of a co-ordinate measuring machine comprising a bed provided with a horizontal measuring surface and a unit that is mobile along guides carried by said bed, said errors being induced by a deformation of the bed, the method comprising the steps of:
- providing the machine with a closed annular structure extending along a perimetral area of the bed and constrained thereto by statically determinate constraint means, and a plurality of displacement sensors set between said annular structure and one between the bed and the mobile unit;
- making the geometrical compensation of the machine;
- setting the reading of the sensors to zero for defining an initial reference condition;
- detecting via the sensors deviations of the relative position between said annular structure and the bed or the mobile unit; and
- updating the geometrical compensation of the machine on the basis of the deviations detected by the sensors.

* * * * *